United States Patent [19]

Sporn

[11] Patent Number: 4,964,369
[45] Date of Patent: Oct. 23, 1990

[54] STRAIN-REDUCING DOG HARNESS

[76] Inventor: Joseph S. Sporn, 274 W. 86th St., #4B, New York, N.Y. 10024

[21] Appl. No.: 522,093

[22] Filed: May 11, 1990

[51] Int. Cl.$^5$ ...................... A01K 15/00; A01K 27/00
[52] U.S. Cl. ......................................... 119/96; 119/109
[58] Field of Search ................. 119/96, 109, 101, 102, 119/126

[56] References Cited

U.S. PATENT DOCUMENTS

| | | | |
|---|---|---|---|
| 2,187,021 | 1/1940 | Everson | 119/96 |
| 2,458,489 | 1/1949 | Hallander | 119/109 |
| 2,605,744 | 8/1952 | Urbanski | 119/96 |
| 2,670,712 | 3/1954 | Patience et al. | 119/96 |
| 2,798,458 | 7/1957 | Odermatt | 119/106 |
| 2,826,172 | 3/1958 | Buckle et al. | 119/96 |
| 2,956,541 | 10/1960 | Rail | 119/96 |
| 3,310,034 | 3/1967 | Dishart | 119/96 |
| 4,060,056 | 11/1977 | Maiett | 119/96 |
| 4,597,359 | 1/1986 | Moorman | 119/96 |
| 4,729,345 | 3/1988 | Anderson | 119/96 |

FOREIGN PATENT DOCUMENTS 2304284  11/1976  France .................................. 119/96

*Primary Examiner*—Paul J. Hirsch

[57] ABSTRACT

A dog harness to which a leash is attachable. When installed on the dog, the harness acts to inhibit the dog from straining against the leash without, however, producing a choking action. The harness comprises a collar that encircles the neck of the dog, and left and right restraint cables whose leading ends are connected to the front section of the collar at left and right positions thereon. The restraint lines go loosely under the left and right foreleg pits of the dog and through respective slip rings attached to the rear section of the collar adjacent its center, the trailing ends of the cables terminating in a coupler to which the leash is attached. When, therefore, the harnessed dog strains at the leash, this acts to tighten the restraint cables which then impose a pressure on the foreleg pits. Because these pits are highly sensitive, in order to relieve this pressure, the dog will then cease to strain against the leash and thereby again loosen the restraint cable.

7 Claims, 2 Drawing Sheets

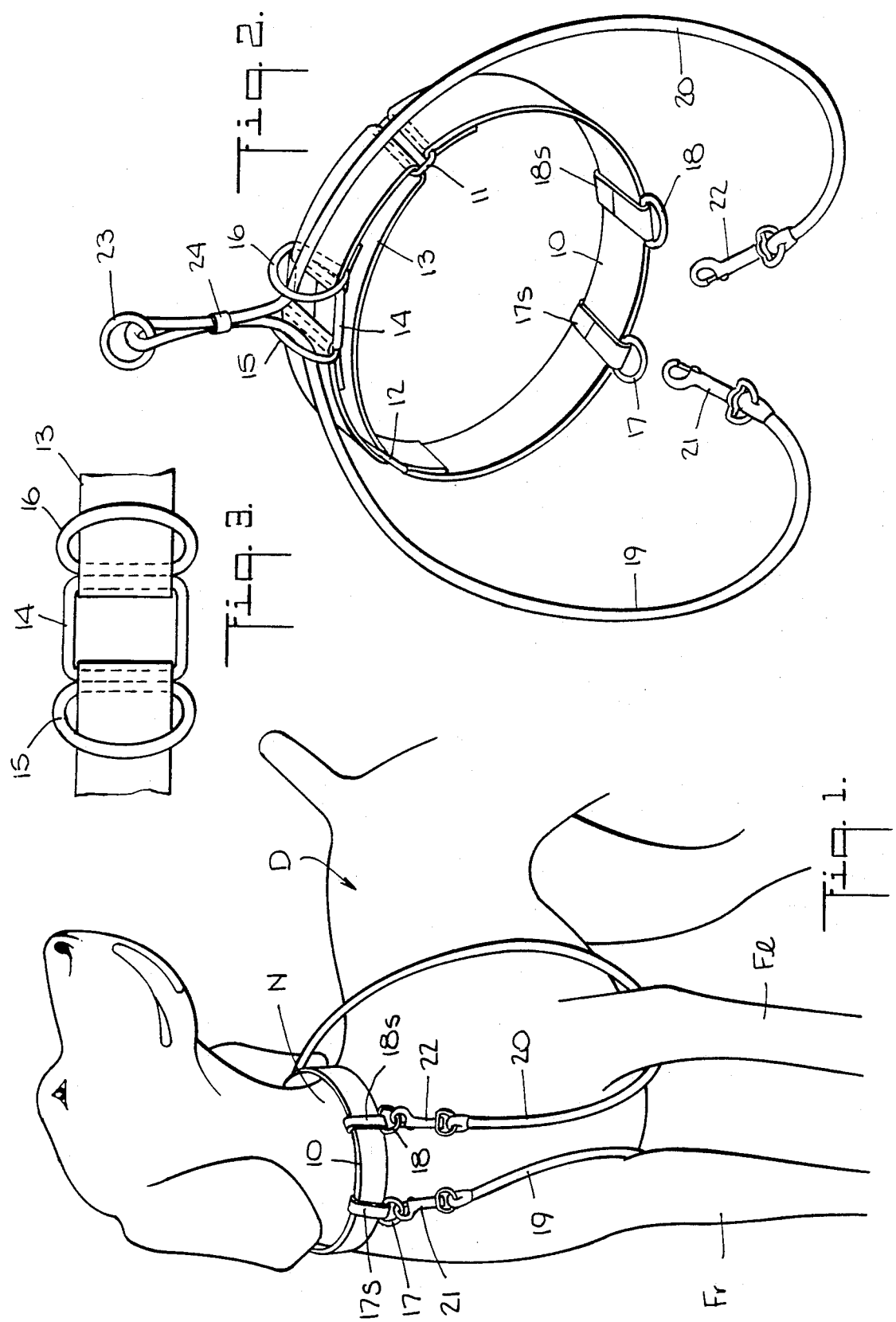

STRAIN-REDUCING DOG HARNESS

BACKGROUND OF INVENTION

1. Field of Invention

This invention relates generally to harnesses for dogs, and more particularly to a harness to which a leash is attachable and which acts to inhibit the dog from straining against the leash without, however, producing a choking action.

2. Status of Prior Art

As pointed out in the Bloom U.S. Pat. No. 2,233,397, when a dog strains against a leash attached to the dog harness, it is important that the harness then avoid a choking effect on the throat of the dog or undue pressure on throat muscles, cords and nerves, for these may have adverse effects on the lungs and heart of the dog.

While Bloom discloses a non-choking harness, this harness does not act to discourage the dog from straining against the leash. Indeed, because the harness is non-choking, there is nothing to inhibit such straining.

The need exists, therefore, for a harness to break older dogs of the habit of straining at the leash and for training younger dogs not to strain at the leash. When a dog strains at the leash, he may, in doing so, wrest the leash from the hands of its master who then loses control of the dog. But this is perhaps a less objectionable aspect of straining, for in the case of a master of advanced years or in a relatively weakened condition, should the master hold tightly onto the strained leash to maintain control of the dog, the master may then be pulled to the ground or otherwise upset, with possibly damaging consequences.

To prevent straining at the leash, hobble type dog harnesses are known, such as the hobble harness disclosed in the Patience et al. U.S. Pat. No. 2,670,712, which normally permits free movement of the animal but which restricts the action of the forelegs when the dog attempts to run away or otherwise get out of control.

The Patience et al. harness includes a conventional dog collar and a shoulder strap that has hoops at its opposite ends that loosely fit over the forelegs of the dog. The shoulder strap is adjustable so that the foreleg hoops can be drawn up but not so tightly as to interfere with normal movement of the dogs forelegs. However, if the dog strains on the leash, this strain is also exerted on the shoulder strap, and the foreleg hoops are then drawn upwardly so that movement of the forelegs is restrained and the dog will be brought to a halt.

A harness of the Patience et al. type imposes a physical restraint on the forelegs, and its effectiveness depends on the strength of the dog. Thus with a small dog, this harness may be fully effective, but with a large and more powerful dog, the harness may fail to restrain the dog, particularly if he succeeds in wresting the leash from the hands of his master.

SUMMARY OF INVENTION

In view of the foregoing, the main object of this invention is to provide a dog harness to which a leash is attachable and which acts to inhibit the dog from straining against the leash without, however, choking the dog or otherwise doing injury to the dog.

A significant feature of a harness in accordance with the invention is that it does not physically restrain foreleg movement and its effectiveness is not dependent on the size of the dog or its strength, for the harness will inhibit straining at the leash, regardless of the breed, size and strength of the dog.

More particularly, an object of this invention is to provide a harness of the above type which when the harnessed dog strains at the leash then acts to impose a pressure on the foreleg pits of the dog, causing the dog to cease to strain.

A harness in accordance with the invention exploits the fact that in a dog, the foreleg pits are highly sensitive, and should a pressure be applied thereto, the normal reaction of the dog is to seek to in some way relieve this pressure. This sensitivity exists regardless of the breed, size and strength of the dog, so that as long as foreleg pit pressure is applied, an immediate reaction will be obtained.

Briefly stated, these objects are attained in a dog harness to which a leash is attachable. When installed on the dog, the harness acts to inhibit the dog from straining against the leash without, however, producing a choking action. The harness comprises a collar that encircles the neck of the dog, and left and right restraint cables whose leading ends are connected to the front section of the collar at left and right positions thereon. The restraint lines go loosely under the left and right foreleg pits of the dog and through respective slip rings attached to the rear section of the collar adjacent its center, the trailing ends of the cables terminating in a coupler to which the leash is attached. When, therefore, the harnessed dog strains at the leash, this acts to tighten the restraint cables which then impose a pressure on the foreleg pits. Because these pits are highly sensitive, in order to relieve this pressure, the dog will then cease to strain against the leash and thereby again loosen the restraint cable.

BRIEF DESCRIPTION OF DRAWING

For a better understanding of the invention as well as other objects and further features thereof, reference is made to the following detailed description to be read in conjunction with the accompanying drawings, wherein:

FIG. 1 shows a dog wearing a harness in accordance with the invention;

FIG. 2 is a perspective view of the harness;

FIG. 3 shows the rear section of the harness collar;

DESCRIPTION OF INVENTION

Figure 4:
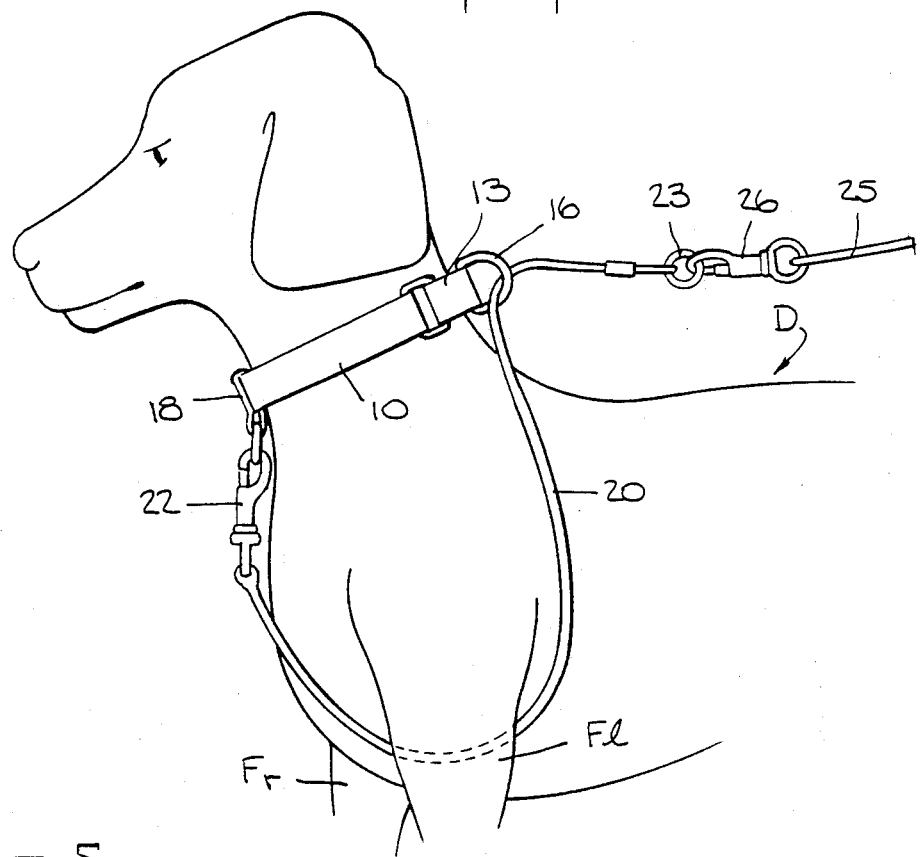
FIG. 4 is a side view of a dog wearing the harness without straining on the leash attached thereto, so that the restraining cables of the harness lie loosely under the foreleg pits.

Referring now to FIGS. 1 to 3, a dog halter or harness in accordance with the invention includes a collar formed of synthetic fabric strapping or similar material, having a front section 10 and a rear section 13. The ends of front section 10 terminate in rectangular metal rings 11 and 12. As best seen in FIG. 2, each end of front section 10 is folded over one leg of the ring and is secured to the strap.

Rear collar section 13 is looped through rings 11 and 12 and its ends are joined together by a rectangular ring 14 to whose legs these ends are attached to form a closed loop. The respective ends of rear collar section 13 are folded over the opposing legs of ring 14 and are secured to the strap. Linked to the folded-over ends of rear section 13 are metal slip rings 15 and 16 which are adjacent to each other on the rear of the rear collar section loop. All metal rings and other metal components of the harness are preferably made of stainless or chrome-plated steel, brass or other non-corroding metal having high strength.

Attached at spaced positions to front section 10 of the collar are right and left metal D-rings 17 and 18. This attachment is effected by fabric strips 17S and 18S which are folded over to encircle the strap of the front section of the collar and are sewn or otherwise secured thereto.

Also provided are right and left restraint cables 19 and 20 formed of braided fabric or other flexible line material having high strength. The leading ends of restraint cables 19 and 20 terminate in retractable metal snap connectors 21 and 22 which are connectable to right and left D-rings 17 and 18 on the front section of the collar, as shown in FIG. 1. Cables 19 and 20 pass through the respective slip rings 15 and 16 linked to the rear section of the collar and terminate in a metal coupler 23 to which a leash is attachable.

The right and left restraint cables 19 and 20 are preferably formed of a single length of cable folded in half to which coupler 23 is linked at its fold. The portions of cables 19 and 20 extending between the fold and slip rings 15 and 16 are held together in parallel relation by a metal slider 24 which can be adjusted up or down to lengthen or shorten restraint cables 19 and 20 to accommodate these cables to the size of the dog being harnessed.

In installing the halter or harness on a dog D, as shown in FIG. 1, the collar formed by front and rear sections 10 and 13 is slipped over the head of the dog to encircle its neck N. Because of the closed loop formation of rear section 13, its effective length, when installed, is determined by the distance between rings 11 and 12 at the ends of the front section 10 through which the loop is threaded. The collar will therefore adjust itself to the size of the dog's neck, the length of the loop being short for a small size neck and large for a large size neck.

After the collar is in place, right and left restraint cables 19 and 20 are guided over the dog's shoulder and under its right and left forelegs $F_r$ and $F_l$. Connector 21 is then snapped onto right D-ring 17 on the front section of the collar and connector 21 is snapped onto left D-ring 18.

Figure 5:
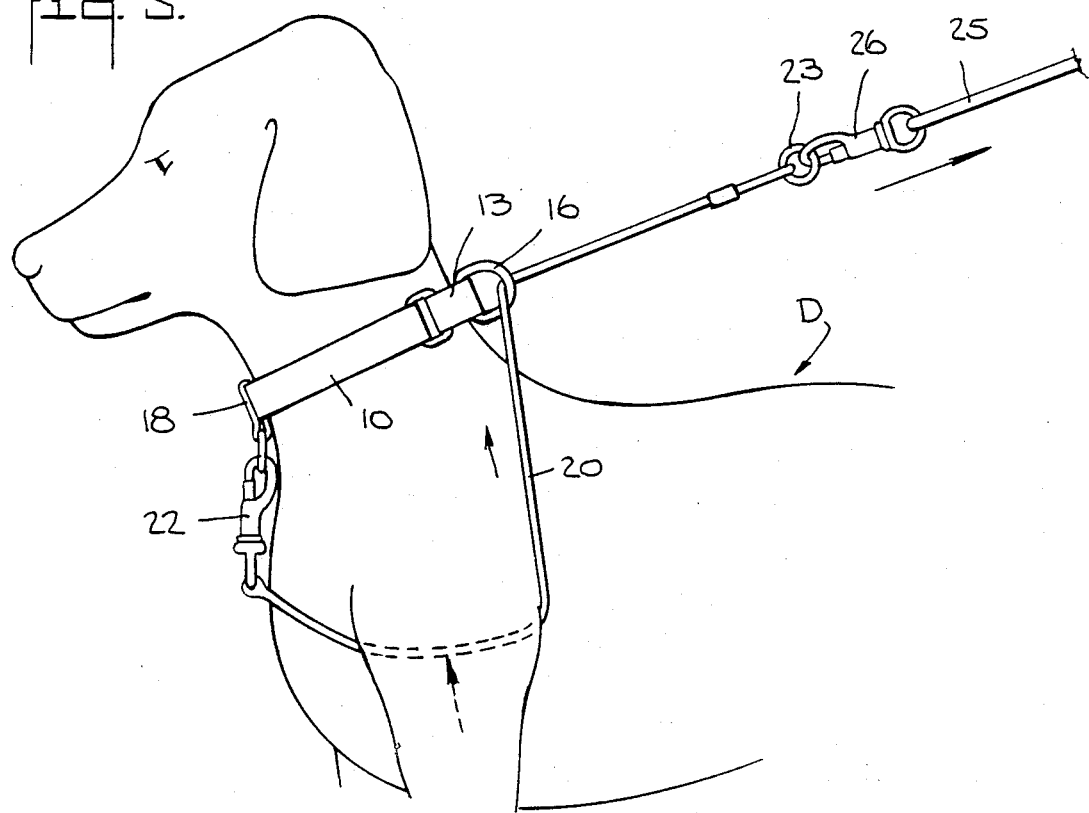
FIG. 5 illustrates a strained leash which acts to apply pressure to the foreleg pits.

As shown in FIGS. 4 and 5, after the dog is harnessed, attached to harness coupler 23 is the metal snap connector 26 at the end of a leash 25, so that the dog is now leashed.

Leash 25 is therefore now coupled to restraining cables 19 and 20 of the dog harness. When no strain is imposed on the leash, the restraining cables 19 and 20, as shown in FIGS. 1 and 4, are loose, and while they go under the forelegs of the dog and lie adjacent the pits of these forelegs $F_r$ and $F_l$, they do not press against these pits.

When, however, as shown in FIG. 5, the dog D strains against leash 25, this strain exerts a pulling force on restraint cables 19 and 20, and as the cables engage and tighten against the foreleg pits, the cables then impose an inward pressure against these pits.

As pointed out previously, it has been found that in a dog, the foreleg pit regions are exceptionally sensitive, and a dog, when pressure is applied to these regions, will seek immediately in some way to relieve this pressure. A typical dog will quickly find that this is best done by relaxing his strain on the leash, for in doing so, the restraint cables are again loosened and the pit pressure is withdrawn.

While the harness is adapted to fit dogs in a range of sizes, its effectiveness as a means to control a dog is independent of the size and strength of the dog, for in all cases the dog will react quickly to pressure applied to the foreleg pits.

The harness, therefore, is a valuable asset in dog training, for it provides the trainer who holds the leash with fingertip control of the dog's movement. It only takes a slight tug on the leash to cause the dog to react. And while a strained leash also imposes a pull on the dog collar, this will not produce a choking effect, for the dog will normally react and relieve the strain on the leash well before this strain reaches a level producing a choking action.

While there has been shown and described a preferred embodiment of a strain-reducing dog harness in accordance with the invention, it will be appreciated that many changes and modifications may be made therein without, however, departing from the essential spirit thereof. Thus instead of a two-section adjustable collar, one may use a single section buckled collar that can be fitted onto dogs having different neck sizes.

I claim:

1. A dog harness adapted to control a dog so that it does not strain against a leash coupled to the harness, said harness comprising:
    (a) a collar adapted to encircle the neck of the dog and having a front section and a rear section, said rear section having a pair of slip rings linked thereto at its center; and
    (b) a pair of restraint cables whose trailing ends terminate in a coupler to which the leash is attachable, the cables running through the respective slip rings and from there over the shoulder of the dog and under its forelegs, the cables having leading ends which are attachable to left and right sites on the front section of the collar, whereby when the leash is unstrained, the cables are loose and when strained the cables are tightened to impose a pressure on the sensitive foreleg pits of the dog, causing the dog to relieve the strain.

2. A dog harness as set forth in claim 1, wherein the front section of the collar terminates at its ends thereof in rings, and the rear section of the collar is threaded through the rings and its ends are joined together to form a closed loop.

3. A dog harness as set forth in claim 2, wherein the ends of the rear section are joined together by a rectangular ring, one leg which is attached to one end of the rear section and another leg to the other end of the rear section, said slip rings being connected to the ends of the rear section.

4. A dog harness as set forth in claim 1, wherein said cables are formed from a single length of line that is folded in half to define the pair of restraint cables, the coupler being at the fold thereof.

5. A dog harness as set forth in claim 2, wherein said collar is formed by fabric strapping.

6. A dog harness as set forth in claim 4, further including a slider encircling the cables at a position between the coupler and the slip rings.

7. A dog harness as set forth in claim 1, wherein said sites have D-rings attached thereto and the leading ends of the cable terminate in snap connectors attachable to the D-rings.

* * * * *